UNITED STATES PATENT OFFICE.

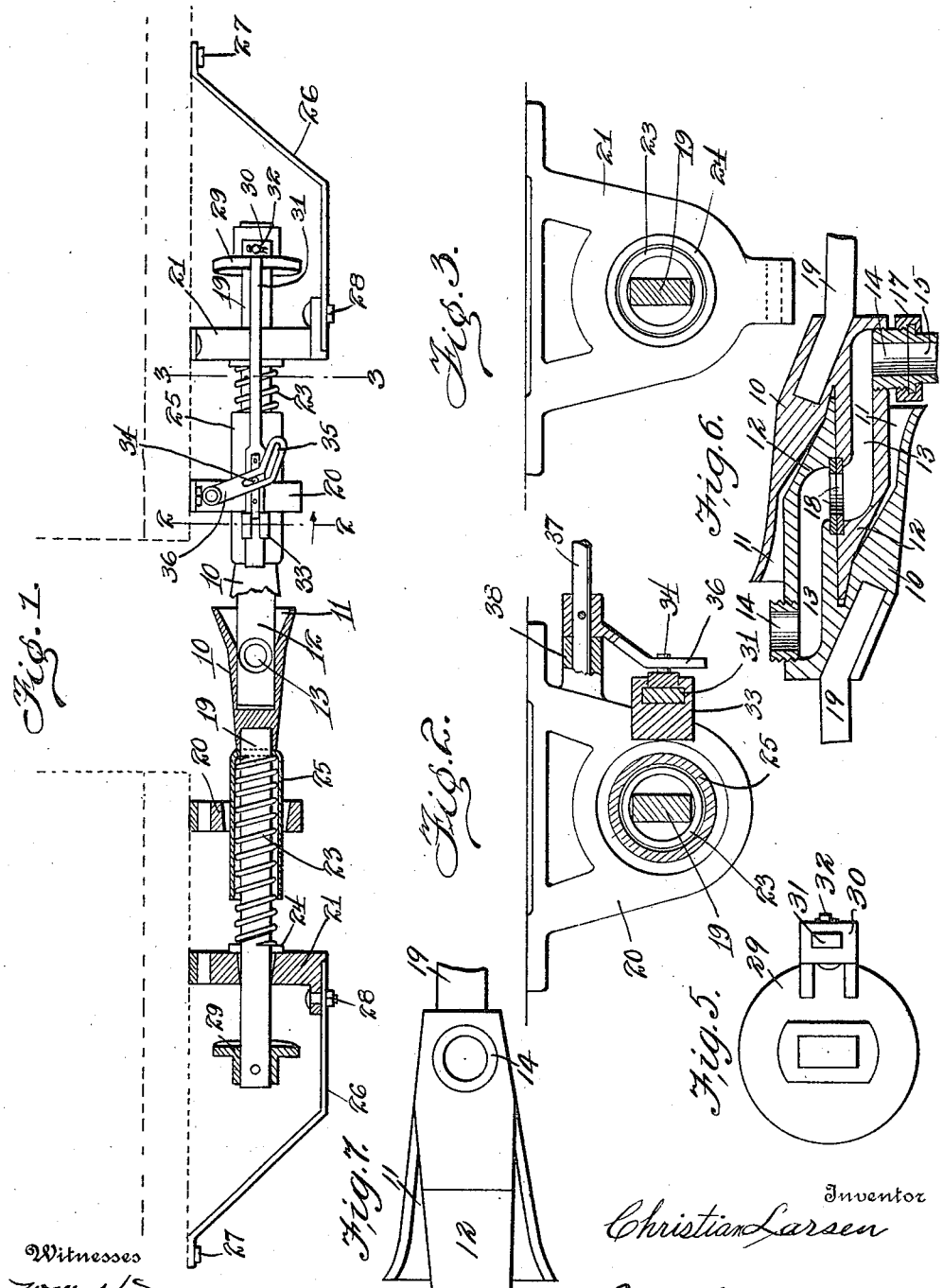

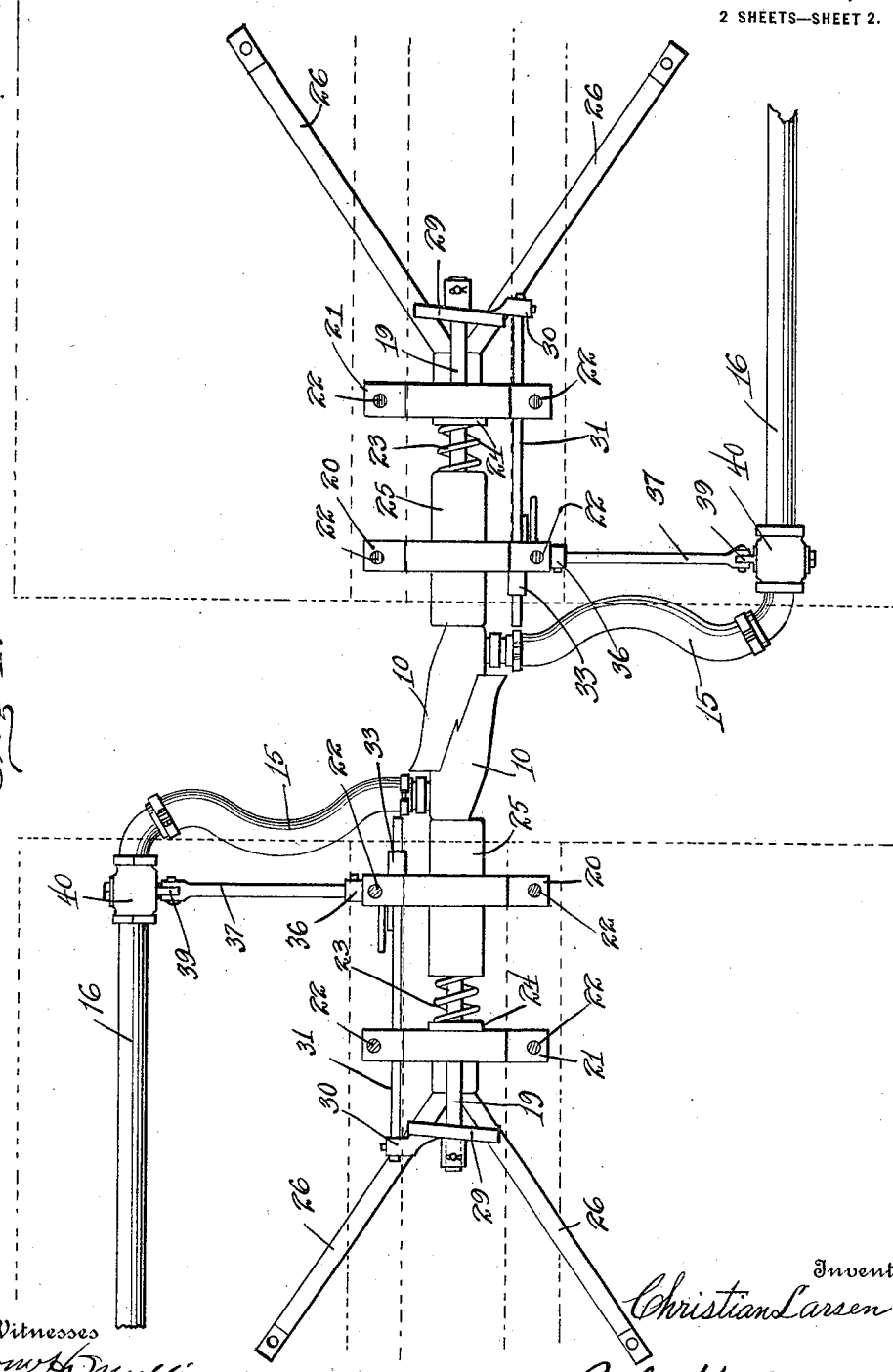

CHRISTIAN LARSEN, OF LAKE BENTON, MINNESOTA.

COMBINED AUTOMATIC COUPLING FOR A TRAIN-PIPE AND VALVE-ACTUATING MECHANISM.

1,144,482.   Specification of Letters Patent.   Patented June 29, 1915.

Application filed April 25, 1914. Serial No. 834,477.

*To all whom it may concern:*

Be it known that I, CHRISTIAN LARSEN, a citizen of the United States, residing at Lake Benton, in the county of Lincoln and State of Minnesota, have invented certain new and useful Improvements in a Combined Automatic Coupler for a Train-Pipe and Valve-Actuating Mechanism, of which the following is a specification.

This invention relates to an automatic coupler for the air pipes of cars, and the principal object of the invention is to provide a coupler which is so constructed that the couplers of the adjoining cars may be automatically connected when the cars are coupled, apparatus being also provided by means of which the controlling valves of the air pipes may be opened when the cars are coupled and closed when the cars are uncoupled.

Another object of the invention is to so construct the coupler that the pipes of the adjoining cars may be securely connected without danger of leakage, and at the same time to permit the air pipes to disconnect in case the coupler of the car does not operate and thus prevent the air pipes from being wrenched loose and destroyed when the train moves and leaves the uncoupled car standing upon the track. This will also prevent danger of a train pipe being wrenched loose by a train-hand forgetting to uncouple the air pipes when two cars are uncoupled.

Another object of the invention is to provide improved means for slidably and yieldably mounting the train couplers, and to also provide a valve operating mechanism so constructed that it will be very simple in construction, but at the same time very effective in operation.

This invention is illustrated in the accompanying drawings wherein—

Figure 1 is a view showing the pipe couplers of adjoining cars, one being shown in longitudinal section and the other in side elevation. Fig. 2 is a transverse sectional view taken along the line 2—2 of Fig. 1; Fig. 3 is a transverse sectional view taken along the line 3—3 of Fig. 1; Fig. 4 is a top plan view of the pipe couplers of adjoining cars; Fig. 5 is a view in elevation looking at the collar mounted upon the inner end of the sliding rod forming part of the coupler; Fig. 6 is a sectional view showing the two couplers in interlocked relation; Fig. 7 is a view in elevation of one of the couplers.

The couplers at the ends of a car are identical in construction, as shown in Fig. 4 where the train pipes of two cars are shown coupled, and therefore a description of the coupler at one end of a car will suffice for a description of both the couplers.

The coupler 10 is provided with a mouth 11 intended to receive the tongue 12 of an adjoining coupler, as shown in Fig. 6, and is provided with an air passage 13 which extends through the tongue 12 longitudinally of the same and has its outer end threaded so that a nipple 14 may be screwed into the outer end of the air passage 13. This nipple 14 is provided so that the flexible hose 15 of the train pipe 16 may be connected with the coupler 10 by means of the union 17 which is screwed upon the outer end portion of the nipple 14 as shown in Fig. 6. The inner end of the air passage 13 terminates in an enlarged seat in which a gasket 18 is placed to form an air tight joint, and thus permit air to pass from the pipe 15 of one car to the pipe 16 of a second car without leakage. The coupler 10 is carried by an arm or bar 19 which passes through the guiding and supporting brackets 20 and 21 secured to the car by means of bolts or other fasteners 22. This arm carries a spring 23 which engages an abutment washer 24 at one end, and has its opposite end portion extending into a guard sleeve 25. This guard sleeve will protect the spring from exposure throughout the greater portion of its length when the pipes are coupled, as shown in Fig. 4, and will also serve to hold the spring in the proper shape and prevent the buckling of the spring. The bracket 20 does not receive any pressure when the spring is compressed, and therefore does not need to be braced, but the bracket 21 needs to be braced in order to prevent its fasteners 22 from working loose or bending; and therefore the braces 26 have been provided. These braces 26 have their upper ends secured to the car by means of the bolts 27 and their lower outer ends secured to the bracket 21 by means of bolts 28.

It should be noted that the braces extend in diverging relation as shown in Fig. 4 in order to better brace the bracket. By having the arms of the couplers slidably mounted and held in a normal position by the springs 23, the couplers will be normally held in an extended position. When the cars of a train are coupled, the two couplers 10 of the train pipes will interlock, as shown in Fig. 6, and the arms will be moved under the cars to the position shown in Figs. 1 and 4. The springs will therefore hold the couplers tightly together and form a very tight joint. While these couplers are held in tight engagement when the cars are coupled, the couplers can easily slip out of engagement with each other when the cars are uncoupled.

An abutment collar 29 is secured to the inner end of the arm 19 to prevent the spring from moving the arm outwardly beyond a desired amount, and is provided with an extension or ear 30 with which the rod 31 is connected by means of the pin 32. This rod 31 extends outwardly with its forward end slidably mounted in the bearing 33, the forward end portion of the rod 31 being flattened and provided with a pin 34 which extends into the slot 35 of the lever 36. This lever 36 is secured to the valve shaft 37 which has one end journaled in the bearing 38 and its opposite end connected with the stem 39 of the valve 40.

When the cars are coupled and the couplers joined as already described, and the arms 19 moved forwardly to the position shown in Figs. 1 and 4, the rods 31 will be drawn inwardly by the collars 29 and will rock the levers 36, thus rotating the valve shafts 37 to turn the valve stems 39 and open the valves of the train pipes 16. The air will then flow through the pipe of one car through its flexible pipe 15 to its coupler 10, and through this coupler into the second coupler connected with the same and through the flexible pipe 15 of the second car into the pipe 16 past the valve 40 of the second car which has also been opened. When the cars are uncoupled and the arms 19 returned to their original position by the springs 23, the rods 31 will be moved outwardly to rotate the shafts 37 and close the valves of the train pipes. It should be noted that the valves are opened and closed while the cars are separating, and that since the couplers 10 do not become disconnected until the springs have expanded as far as possible, the air will not escape from the pipes and be wasted.

It will thus be seen that a very efficient train pipe coupler has been provided by means of which the pipes may be automatically connected and disconnected as the cars are coupled; and which is so constructed that the valves of the air pipes may be opened and closed as the cars are coupled or uncoupled. It will also be noted that it is not necessary for the train-man to walk between the cars to connect the air pipes or to open or close the valves 40 since the couplers work automatically and do not need any attention whatever.

What is claimed is:

1. A system of the character described comprising a pipe, supporting means, a carrying member carried by said supporting means, means for yieldably holding said carrying means in a normal position, a coupler carried by said carrying means, a valve for said pipe, a pipe connected with said coupler and with said first-mentioned pipe, a shaft leading from the stem of said valve and rotatably connected with said supporting means, an operating lever carried by said shaft, and a rod slidably connected with said lever and having one end portion slidably connected with said supporting means and the opposite end connected with said carrying means whereby movement of said carrying means will move said rod to move said lever and rotate said shaft to operate said valve.

2. A system of the character described comprising a valve-controlled conduit, supporting brackets, carrying means slidably supported by said brackets, a coupler carried by said carrying means and communicating with said conduit, resilient means mounted upon said carrying means between said coupler and one of said brackets to yieldably hold said carrying means in a normal position, a valve shaft leading from the valve of said conduit and rotatably connected with one of said supporting brackets, an operating lever extending from said shaft and provided with a slot, and a rod connected with said carrying means and slidably connected with one of said brackets and provided with a pin passing through the slot of said lever to cause said lever to be moved when said carrying means is moved and move said lever to turn the shaft and operate said valve.

3. A system of the character described comprising a valve-controlled conduit, supports, a carrying member carried by said supports, a coupler carried by said carrying member and connected with said conduit, a spring placed upon said carrying member between said coupler and one of said supports, a shaft connected with the stem of the valve of said conduit and rotatably connected with one of said supports, an operating lever carried by said shaft, a guide carried by said supports, a collar carried by said carrying member, a rod connected with said collar and having its opposite end portion supported by said guide, and means connecting said rod with said lever to cause said lever to be moved when said rod is
5 moved by said carrying member and cause said shaft to be rotated to operate the valve of said conduit.

In testimony whereof I affix my signature in presence of two witnesses.

CHRISTIAN LARSEN.

Witnesses:
   PETER J. SORENSEN,
   N. M. WIND.

Copies of this patent may be obtained for five cents each, by addressing the "Commissioner of Patents, Washington, D. C."